United States Patent [19]

Rustin et al.

[11] 4,341,182
[45] Jul. 27, 1982

[54] ANIMAL WATERING APPARATUS

[76] Inventors: Francis Rustin; Morris C. Keller, both of 2170 E. Blaine, Springfield, Mo. 65803

[21] Appl. No.: 210,687

[22] Filed: Nov. 26, 1980

[51] Int. Cl.³ .................... A01K 39/00; A01K 7/06
[52] U.S. Cl. ........................................................ 119/75
[58] Field of Search .................. 119/72, 72.5, 73, 74, 119/75, 81

[56] References Cited

U.S. PATENT DOCUMENTS

| | | | |
|---|---|---|---|
| 2,626,724 | 1/1953 | Smallegan | 119/72 X |
| 2,988,048 | 6/1961 | Zimmerman | 119/81 |
| 3,241,526 | 3/1966 | Essink et al. | 119/81 X |
| 3,285,227 | 11/1966 | Mitchell | 119/72 X |
| 3,298,356 | 1/1967 | Sutton | 119/74 |
| 4,267,800 | 5/1981 | Keller et al. | 119/72.5 |

Primary Examiner—Gene Mancene
Assistant Examiner—Robert P. Swiatek
Attorney, Agent, or Firm—Peter J. Murphy

[57] ABSTRACT

A parallel array of a lower elongated plastic water pipe, an intermediate elongated compression member, and an upper tensioned cable is supported at the ends by rigid end support members. Animal operated drinker valves, mounted within upward opening cups, are disposed in longitudinally spaced relation on the upper face of the water pipe. The entire apparatus is suspended from an overhead support by the end supports. Intermediate spacer brackets maintain the spaced relation of the pipe, compression member, and tensioned cable. Where the cable functions as an anti-roost cable for poultry, additional cable supports are mounted on the compression member and secured to the cable to maintain the spacing of these two members. In alternative form an elongated support bar of V-shaped cross-section is maintained in contiguous relation with the pipe by spaced clamps, to serve as an additional anti-sag support for the watering unit.

17 Claims, 9 Drawing Figures

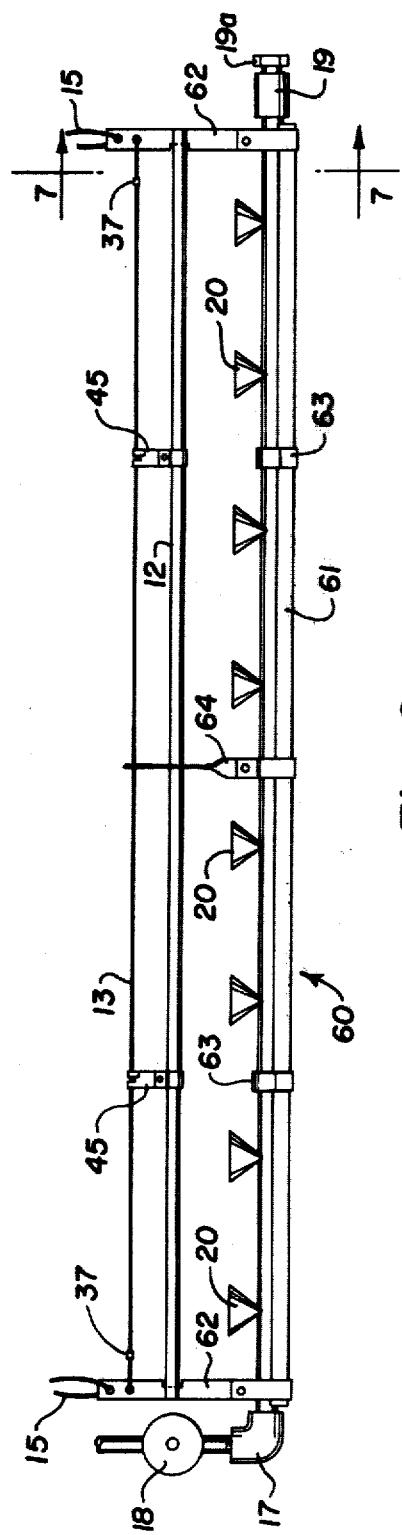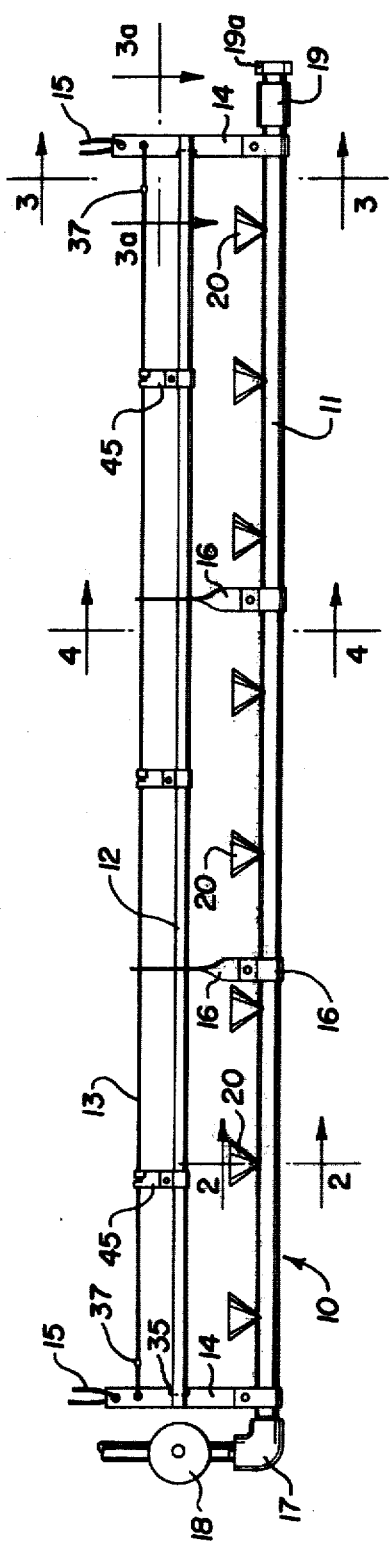

ANIMAL WATERING APPARATUS

This invention relates to watering apparatus for animals such as poultry, including water release valves operated by the animals; and more particularly to a watering unit of short to medium length to be suspended from an overhead support such as the rafters of a poultry house or animal shelter.

A popular sized watering unit for poultry or other animals is a unit about 8 feet in length having an independent water supply. Watering units adapted to be suspended from an overhead support are popular for the reasons that they may be raised relative to the ground or floor level during the growth of the animals, and also for the reason that they may be raised out of the way for the purpose of cleaning or preparing the surface area under the watering units.

A principal object of this invention is to provide an independent, suspended watering unit of short to medium length, having a unique construction.

Another object of this invention is to provide such unit including water release valves which are operated very easily by the animals, which provides automatically fresh water for the animals, and which eliminates water spillage thereby reducing waste and a wet floor area which may encourage opportunity for disease among the animals.

A further important object of this invention is to provide such a watering unit which requires a minimum of attention and maintenance by the operators of the installation.

Still another object of this invention is to provide such unit of light weight and simple construction fabricated from readily available materials, thereby minimizing manufacturing and installation costs.

Another object of this invention is to provide such a short to medium length watering unit requiring a minimum of overhead supports.

A further object of this invention is to provide a unique suspended independent watering unit of short length, including an anti-roost cable for use with poultry.

Still another object of this invention is to provide a unique suspended watering unit consisting of an assembly of basic short length units to produce independent units of longer length as required by the operator of the installation.

A still further object of this invention is to provide a unique short length watering unit of very simple construction which eliminates any sag between the suspended ends of the unit.

These objects are accomplished in watering apparatus which comprises a generally parallel array of an elongated water pipe, an elongated compression member, and an elongated tension member. A pair of transverse rigid support members support this array at the opposite ends thereof, with the water pipe at the bottom of the array and with the tension member at the top of the array. The support members have means at their upper ends for suspending the watering apparatus from an overhead support. These support members are secured rigidly to the water pipe, the compression member being joined to the support members to resist movement of the support members toward each other, and the tension member is placed in tension to urge the support members toward each other, whereby the array resists sagging between the support members.

A plurality of drinker valves, to be operated by the animals, are mounted in longitudinally spaced relation on the water pipe.

More particularly, at least one spacer bracket may be disposed between the support members for maintaining the spaced relation of the water pipe, the compression member, and the tension member. Also, more particularly, a rigid elongated support bar having a length generally coextensive with that of the water pipe may be clamped to that pipe in contiguous parallel relation by the support members and by other clamping members.

The novel features and the advantages of the invention, as well as additional objects thereof, will be understood more fully from the following description when read in connection with the accompanying drawings.

DRAWINGS

FIG. 1 is a side view of a preferred form of watering unit according to the invention;

FIG. 6 is a side view of an alternative form of watering unit according to the invention.

DESCRIPTION OF THE PREFERRED EMBODIMENTS

Figure 2:
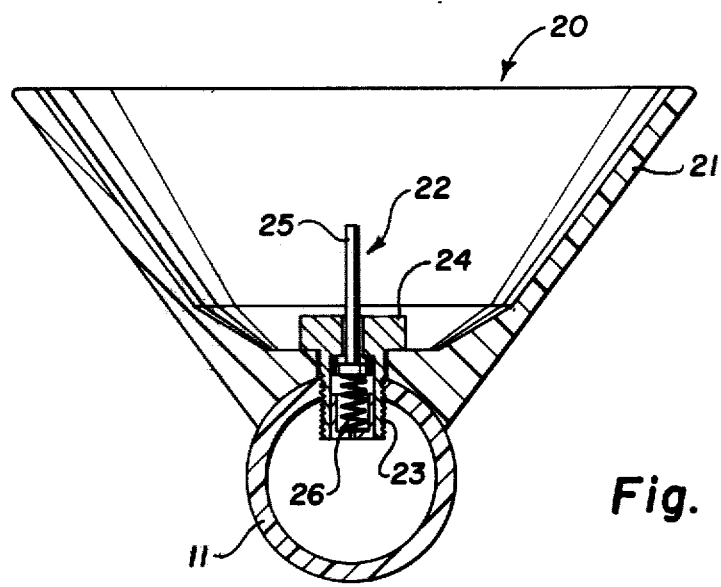
FIG. 2 is a transverse sectional view taken along the line 2—2 of FIG. 1, particularly illustrating a watering valve and cup.

FIGS. 1 through 4a of the drawing illustrate one preferred form of apparatus according to the invention. FIG. 1 is a side view of a short unit, which might be an 8 foot unit for example, shown in the normal orientation suspended from an overhead support. This unit 10 consists of a parallel array of a lower elongated water pipe 11, an intermediate compression member 12, and an upper tension member 13. This array is supported in that parallel arrangement by end support members 14 which are vertically elongated rigid end hangers having means at their upper ends for suspending the unit by means of overhead cables 15 for example. A pair of spacer brackets 16 are disposed between the end support members 14; and these spacer brackets maintain the spaced relation of the water pipe, the compression member, and the tension member. These spacer brackets also coact with the remainder of the described structure to provide a non-sagging unit suspended at its ends by the support members 15.

A plurality of drinker cup and valve assemblies 20 are mounted on the water pipe 11 in longitudinally spaced relation, being spaced apart approximately 1 foot, when the unit 10 is an 8 foot unit, for example.

By way of example, the water pipe 11 may be plastic pipe fabricated from polyvinyl chloride, commonly referred to as "PVC pipe" and being ¾ inch size for example.

The illustrated form of compression member 12 may be a length of aluminum tubing which is commonly referred to as electrical conduit, and which may be the ½ inch size of such electrical conduit for example. The tension member 13 may be a 1/16 inch woven wire cable.

The support members 14 and the spacer brackets 16 are fabricated preferably from 16 gauge galvanized sheet metal, and formed from 1¼ inch wide strips of that material.

Figure 3A:
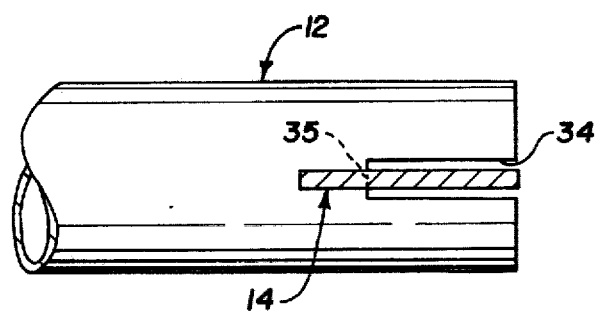
FIG. 3a is a fragmentary detail view taken along the line 3a—3a of FIG. 1.
Figure 3:
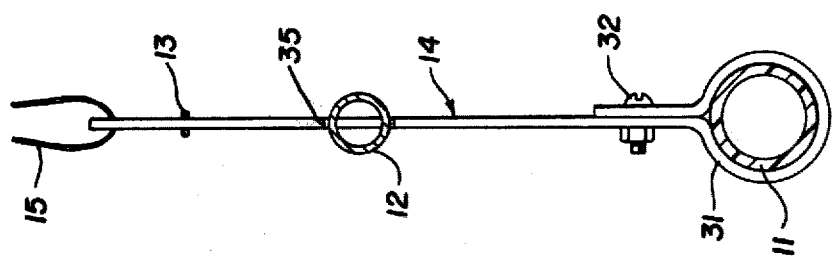
FIG. 3 is a transverse sectional view taken along the line 3—3 of FIG. 1, particularly illustrating an end support member.

FIG. 3 particularly illustrates the configuration of an end support member 14 as viewed from an end of the assembly. As seen, a cylindrical clamping loop 31 is formed at the lower end of the member, provided with a clamping screw and nut assembly 32, and configured to tightly clamp the support member around the pipe to prevent relative axial movement of these members. FIG. 3a is a detail illustrating the joining of an end of the compression member 12 to the support member 14; and it will be seen that the end of the conduit 12 is provided with an end slot 34 dimensioned to receive a substantial portion of the width of the support member strap 14. The support member 14 is provided with a notch 35 in one edge, intermediate its ends, which is slightly wider than the diameter of the conduit 12 to receive the base of the conduit slot in interlocking relation. This interlocking relation is maintained by the tension cable 13.

The tension cable 13 passes through a suitable hole adjacent to the upper end of the support member 14; and a loop is formed at the end of the cable, and fixed by a cable clamp 37, to secure the tension cable to the support member. In the assembly of the unit, this tension cable 13 is stressed in tension from 25 to 40 pounds for example, between the two end support members; and this tension is enabled by the fact that movement of the brackets toward each other is resisted by the compression conduit 12, and further by the fact that longitudinal movement of the support member 14 is prevented by the tightly clamped attachment to the water pipe 11.

Figure 4:
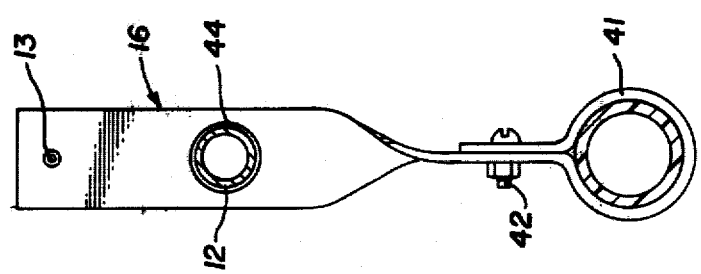
FIG. 4 is a transverse sectional view taken along the line 4—4 of FIG. 1, particularly illustrating a spacer bracket.

FIG. 4 particularly illustrates a spacer bracket 16 as viewed from an end of the assembly. This bracket includes a clamping loop 41 formed at the lower end of the bracket and secured by a bolt and nut assembly 42 to tightly clamp the water pipe 11. Above the clamping loop, the bracket body is twisted 90°, and a hole 44 just large enough to pass the conduit 12 is disposed in this upper portion. The upper end of the spacer bracket is provided with a suitable hole to pass the tension cable 13. These spacer brackets then serve to rigidify the frame structure defined by the water pipe 11, the compression conduit 12 and the end support member 14. These brackets then also maintain the spaced relation of the tensioned cable relative to the compression conduit.

FIG. 2 illustrates in detail a drinker valve and cup assembly 20. The drinker cups 21 are preferably secured on the pipe 11 by associated drinker valves 22; and these drinker cups and drinker valves may be of any suitable design. As seen in the drawing, the cup 21 has a generally conical shape with conical exterior and interior walls, and with a generally flat interior base wall for the seating of a portion of the drinker valve 22. The exterior of the cup base is provided with a transverse cylindrical surface having a diameter corresponding to the exterior diameter of the pipe 11 to provide for the secure seating of the cup on the pipe.

Figure 4A:
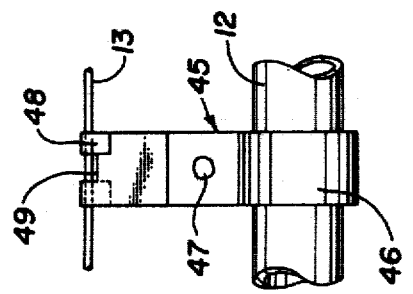
FIG. 4a is an enlarged detail view of a cable support.

The water pipe 11 is provided with holes for receiving the body of the valve 22. A desired form of valve has an elongated generally cylindrical body 23 externally threaded throughout a good portion of its length and having a hex head 24 at one end providing a transverse external shoulder for engaging and clamping the cup 21. In a preferred form the valve body may be provided with a starter thread to form a mating thread in the respective pipe holes. Internally, the valve has a stepped bore defining a valve seat shoulder; and a valve closure member 25 consists of a head engaging the valve seat in sealing relation, and a stem extending through and projecting beyond the hex head end of the body. An internal biasing spring 26 maintains the valve closure member in the closed position. The closure member is tiltable by the animals to allow water to flow from the pipe 11 into the cup 21.

Where the watering unit is used for watering poultry, the tension cable 13 functions as an anti-roost cable. If, under the weight of the poultry seeking to roost on the cable, the cable should move against the conduit 12, the birds might be able to maintain a roost position by grasping the cable and conduit. To prevent this it may be desirable to place several intermediate cable supports 45, which may be clamped to the conduit 12 and maintain the spaced relation between the conduit and the cable 13. Such cable supports are illustrated in FIG. 1 and a particular form of such support is illustrated in detail in FIG. 4a. Referring to FIG. 4a, the cable support includes a clamping loop 46 to be clamped around the conduit and secured by a pop rivet 47. The upper end of the cable support is bifurcated to provide a pair of spaced fingers or tabs 48 separated by an end slot 49. The tabs 48 are bent over the cable 13 in opposite directions, as best seen in FIG. 4a, so that the base of the slot 49 provides a separating support for the cable relative to the conduit.

Completing the assembly of the unit 10, it will be noted that the water pipe 11 extends slightly beyond the end support member 14 at both ends. At the inlet end, an elbow 17 is fixed to the pipe 11 and a suitable pressure regulator 18 is mounted on the elbow 17 for connection to a suitable supply source of water. A female adapter 19 and associated threaded plug 19a are mounted at the opposite end of the water pipe 11 to enable flushing of the unit when desired.

The above described assembly provides a quite rigid drinking unit of relatively short length such as 8 feet for example, which is suspended by means of the end support members 14 and which provides a non-sagging structure of relatively simple construction. The tensioned cable 13 provides an anti-roost member, desirable when the drinker unit is used for poultry.

Figure 5:
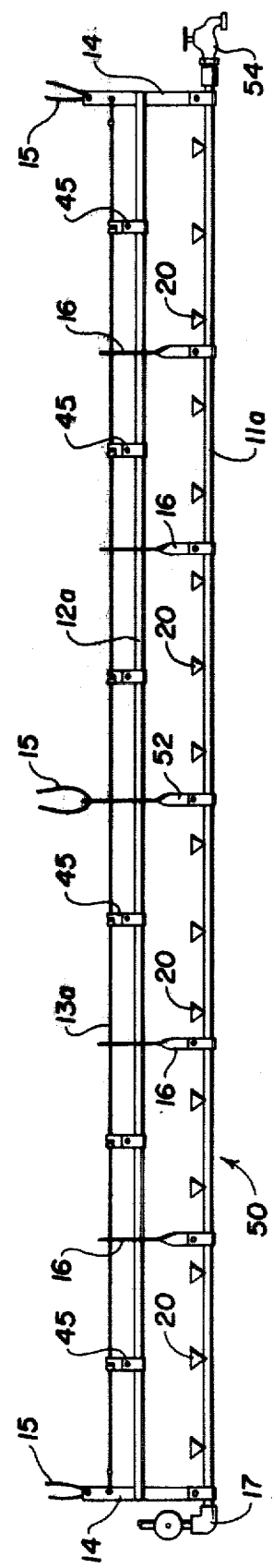
FIG. 5 is a side view of an alternative form of waterer unit formed from a combination of several units of the type illustrated in FIG. 1.

Embodiment of FIG. 5

FIG. 5 of the drawing illustrates a double length unit 50 having a construction based generally on the joining of two units 10 as described above; and this unit 50 is representative of longer units which may be made up of two, three or more sections of the type described in FIG. 1 somewhat modified to use common parts. The same reference numbers will be used to identify identical parts.

This unit 50 is substantially identical in construction to that of the unit of FIG. 10 except that it is double length; and the lengths of the water pipe 11a, the compression conduit 12a and the tension cable 13a are substantially twice the length of the counterpart members in the unit 10. This unit includes three support members, two end support members 14 and an additional center support member 52, all being supported by suspension cables 15 from an overhead support. The end support members 14 are clamped rigidly to the pipe 11a in the manner described, and are coupled to the compression conduit 12a in the same or similar manner. The center support member 52 may be substantially identical to the spacer bracket 16, but having an extended upper end provided with an additional hole for a suspension cable 15. This unit includes the spacer brackets 16 and the cable supports 45 described for the unit 10. This longer length unit would be served by a single pressure regulator 18 at one end; and drainage faucet 54 may be provided at the other end.

Figure 7:
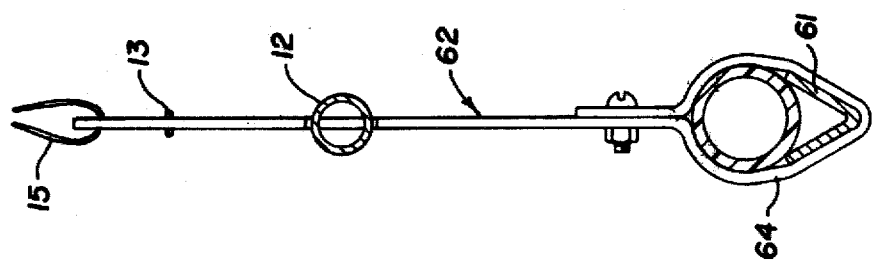
FIG. 7 is a transverse sectional view taken along the line 7—7 of FIG. 6, particularly illustrating a support bar and a modified end support member configuration.

Embodiment of FIGS. 6 and 7

FIGS. 6 and 7 illustrate an alternative form of a short watering unit, according to the invention, having a length of 8 feet for example. FIG. 6 is a side view of this unit again consisting of a parallel array of a water pipe 11, a compression conduit 12 and a tension cable 13, with an additional elongated rigid support bar 61 maintained in contiguous relation to the pipe 11 by several clamping means to be described. The support bar 61 provides an additional rigidifying element, and minimizes the need for stabilizing members such as spacer brackets 16 illustrated in FIG. 1. A single spacer bracket 64, substantially identical to the spacer bracket 16, is shown intermediate the ends of the unit. Intermediate cable supports 45 are also shown.

FIG. 7 is a transverse sectional view illustrating the cross-sectional configuration of the support bar 61 and also indicating the modified form of end support members 62 to clamp tightly the pipe 11 and the support bar 61 in the illustrated contiguous relation. To maintain this contiguous relation between the ends of the unit, two intermediate band clamps 63 are provided.

A preferred form of support bar is fabricated from a 1½ inch strap of 14 gauge galvanized steel, bent along the midline with a 120° break to form a member having a V-shaped cross-section with an included angle of 60°. In assembled relation the pipe 11 is nested in the channel face of the support bar 61; and these members are clamped tightly together to provide an integrated non-bending assembly of the pipe 11 and support bar 61.

As seen in FIG. 7, clamping loops 64 are formed at the lower ends of the support members 62, configured to tightly clamp the integrated assembly of pipe and support bar. These end support members 62 are joined to the compression conduit 12 and the tension cable 13 in the same manner as described for the unit 10 of FIG. 1. This unit 50 provides a relatively short drinker unit of simple rigid construction, adapted to be suspended from its ends, and which also provides an anti-roost cable desirable when the unit is used for watering poultry.

What has been described is a unique, independent suspendible, drinker unit of relatively short length for use in the watering of small animals such as poultry for example. An important feature and advantage of the invention is that such units are simple and practical in construction, enabling economic manufacture of units in standard lengths, and minimizing installation costs. An important feature of the invention is that 8 foot watering units are provided, being suspendible only from the two ends, and which are of simple and non-sagging construction assuring the uniform height of the several drinker valves from the floor surface. Another important feature and advantage of the invention is that it enables the construction of such drinker units, utilizing animal operated drinker valves and cups, which provide fresh water for the animals on demand, which eliminate waste of water, and which substantially prevent spillage of water in the area of the drinker units thereby maintaining a dry area for the animals and minimizing the opportunity for disease due to damp conditions.

An ancillary feature of the invention is that, where longer than standard length units are desired, the construction enables fabrication of double or triple length units, for example, with slight modification.

Another feature of the invention is the provision of tensioned anti-roost cables, to eliminate the roosting problem when the watering units are used for poultry.

While preferred embodiments of the invention have been illustrated and described, it will be understood by those skilled in the art that changes and modifications may be resorted to without departing from the spirit and scope of the invention.

What is claimed is:

1. Animal watering apparatus comprising
a length of water pipe; a pair of elongated rigid end support members having their respective lower ends fixed to said pipe, adjacent to the opposite ends thereof;
an elongated compression member disposed between said support members in generally parallel relation to said pipe; said compression member being secured at its opposite ends to said support members intermediate the ends thereof;
an elongated tension member connected between said support members adjacent to the upper ends thereof, in generally parallel relation to said compression member and said pipe; said tension member being stressed in tension, whereby said compression member is stressed in compression and said pipe is stressed in tension;
a plurality of drinker valves, to be operated by the animals, mounted in longitudinally spaced relation on said pipe;
and said support members having means at the upper ends thereof for suspending said watering apparatus from an overhead support.

2. Animal watering apparatus as set forth in claim 1
a rigid bracket member disposed between said support members for maintaining the generally parallel spaced relation of said pipe, said compression member, and said tension member.

3. Animal watering apparatus as set forth in claim 1
a support bar having a length generally coextensive with the length of said water pipe, disposed in parallel contiguous relation with said water pipe; and means for maintaining said support bar and said water pipe in contiguous relation as a unitary assembly.

4. Animal watering apparatus as set forth in claim 3
said support bar having a uniform generally V-shaped cross-section; and said water pipe nesting partially within the channel of said support bar.

5. Animal watering apparatus as set forth in claim 4
said water pipe being fabricated from a plastic material; said support bar being fabricated from sheet metal to provide a rigid support for said plastic water pipe.

6. Animal watering apparatus as set forth in claim 1
said tension member comprising a flexible strand.

7. Animal watering apparatus as set forth in claim 6
a plurality of longitudinally spaced strand supports clamped to said compression member and secured to said strand to maintain the spaced relation of said strand and said compression member.

8. Animal watering apparatus as set forth in claim 1
each of said drinker valves being mounted with an upwardly opening cup; each said drinker valve and associated cup being mounted on the upper side of said water pipe, with said valve communicating the interior of said pipe with a respective cup; each of said valves being biased to a normally closed position, and being opened by an animal to allow water flow into a respective cup.

9. Animal watering apparatus as set forth in claim 1
pressure controlling means mounted at one end of said pipe for communication with a water supply.

10. Animal watering apparatus as set forth in claim 1
at least one intermediate support member, disposed between said end support members, having means at its upper end for suspending said watering apparatus from an overhead support.

11. Animal watering apparatus comprising
a generally parallel array of an elongated water pipe, an elongated compression member, and an elongated tension member;
a pair of transverse rigid support members supporting said array adjacent to the opposite ends thereof, with said water pipe at the bottom and with said tension member at the top of said array; said support members having means at the upper ends thereof for suspending said apparatus from an overhead support;
said support members being secured rigidly to said water pipe, said compression member being joined to said support members to resist movement of said support members toward each other, and said tension member being placed in tension to urge said support members toward each other, whereby said array resists sagging between said support members;
and a plurality of drinker valves, to be operated by the animals, mounted in longitudinally spaced relation on said water pipe.

12. Animal watering apparatus as set forth in claim 11
at least one spacer bracket disposed between said support members for maintaining the spaced relation of said water pipe, said compression member, and said tension member.

13. Animal watering apparatus as set forth in claim 11
a rigid elongated support bar having a length generally coextensive with that of said water pipe, disposed in parallel contiguous relation with said water pipe;
means for securing said support bar to said watering pipe together, in said contiguous relation.

14. Animal watering apparatus as set forth in claim 13
said support bar having a uniform, generally V-shaped cross-section; and said water pipe nesting partially within the channel of said V-shaped support bar.

15. Apparatus as set forth in claim 14
said water pipe being fabricated from a plastic material; said support bar being fabricated from sheet metal to provide a rigid support for said plastic water pipe.

16. Animal watering apparatus as set forth in claim 11
said tension member comprising a stranded cable.

17. Animal watering apparatus as set forth in claim 11
each of said drinker valves being mounted within an upwardly opening cup; each said drinker valve and associated cup being mounted on the upper side of said water pipe, with said valve communicating the interior of said pipe with a respective cup; each of said valves being biased to a normally closed position, and being opened by an animal to allow water flow into a respective cup.

* * * * *